United States Patent
Sugahara

(10) Patent No.: US 10,838,550 B2
(45) Date of Patent: Nov. 17, 2020

(54) CHANGING SPECIFICATION OF OPERATION BASED ON START POSITION

(71) Applicant: SEIKO EPSON CORPORATION, Tokyo (JP)

(72) Inventor: Tatsuya Sugahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 516 days.

(21) Appl. No.: 15/421,134

(22) Filed: Jan. 31, 2017

(65) Prior Publication Data

US 2017/0220198 A1 Aug. 3, 2017

(30) Foreign Application Priority Data

Feb. 3, 2016 (JP) ................. 2016-018637

(51) Int. Cl.
| | | |
|---|---|---|
| *G06F 17/20* | (2006.01) | |
| *G06F 3/041* | (2006.01) | |
| *G06F 3/0482* | (2013.01) | |
| *G06F 3/0484* | (2013.01) | |
| *G06F 3/0488* | (2013.01) | |
| *G06F 3/12* | (2006.01) | |

(52) U.S. Cl.
CPC .......... *G06F 3/0418* (2013.01); *G06F 3/0482* (2013.01); *G06F 3/04842* (2013.01); *G06F 3/04883* (2013.01); *G06F 3/04886* (2013.01); *G06F 3/1204* (2013.01)

(58) Field of Classification Search
CPC ................. G06F 3/0482; G06F 3/0488; G06F 3/048–04886; G06F 3/04842; G06F 3/04883; G06F 3/0485; G06F 3/0483
See application file for complete search history.

(56) References Cited

U.S. PATENT DOCUMENTS

| | | | |
|---|---|---|---|
| 2012/0113007 A1* | 5/2012 | Koch ................... | G06F 3/0488 345/168 |
| 2015/0015507 A1 | 1/2015 | Yoshida | |
| 2015/0095846 A1* | 4/2015 | Danton ................. | G06F 3/0484 715/784 |
| 2015/0130718 A1* | 5/2015 | Sahashi ................. | G06F 3/0482 345/158 |
| 2015/0253952 A1 | 9/2015 | Shikata et al. | |

FOREIGN PATENT DOCUMENTS

| | | |
|---|---|---|
| CN | 101963862 A | 2/2011 |
| CN | 104915134 A | 9/2015 |
| JP | 2014-153951 | 8/2014 |
| JP | 2015018325 A | 1/2015 |
| JP | 2015138287 A | 7/2015 |

* cited by examiner

*Primary Examiner* — Keith D Bloomquist
(74) *Attorney, Agent, or Firm* — Workman Nydegger

(57) ABSTRACT

An electronic apparatus includes a display, a change unit, and a specification unit. The change unit changes a specification algorithm for specifying an operation with respect to the display according to a start position of the operation. The specification unit specifies the operation based on the specification algorithm.

7 Claims, 6 Drawing Sheets

CASE OF NOT LIST REGION
OR BUTTON REGION
(S100)

CASE OF LIST REGION
(S115)

CASE OF BUTTON REGION
(OTHER THAN REGION NEAR CENTER)
(S125)

CASE OF BUTTON REGION
(NEAR CENTER)
(S130)

CHANGING SPECIFICATION OF OPERATION BASED ON START POSITION

The entire disclosure of Japanese Patent Application No: 2016-018637, filed Feb. 3, 2016 is expressly incorporated by reference herein in its entirety.

BACKGROUND

1. Technical Field

The present invention relates to an electronic apparatus and a control program thereof.

2. Related Art

In the related art, various operations including tap and swipe as an operation with respect to a touch panel are known (for example, JP-A-2014-153951).

In the related art, a tap operation and a swipe operation are distinguished from each other according to an amount of movement from a position (operation start position) in which touch is performed for the first time. That is, in a case where the amount of movement from the operation start position is smaller than a predetermined threshold, it is determined to be the tap operation, and in a case where the amount of movement from the operation start position is equal to or greater than the predetermined threshold, it is determined to be the swipe operation. However, for example, although, on a screen on which a list of thumbnail images is displayed, a user intends to perform the swipe operation to scroll the list, the tap operation may be recognized in a touch panel side without recognizing the swipe operation, therefore a corresponding process recognizing that the thumbnail image displayed on a touch position is selected without scrolling the list can start. In addition, there is a case where a process corresponding to the button cannot be performed since the tap operation performed with respect to a button displayed on the screen is recognized as the swipe operation without recognizing the tap operation.

SUMMARY

An advantage of some aspects of the invention is to provide an electronic apparatus in which it is difficult for a user to erroneously perform an operation.

According to an aspect of the invention, there is provided an electronic apparatus including: a display; a change unit that changes a specification algorithm for specifying an operation with respect to the display according to a start position of the operation; and a specification unit that specifies the operation according to the specification algorithm.

Operations (or operation to be frequently performed by user, operation with high priority, or the like) having a high possibility to be performed by a user are different according to attributes of a start position of the operation within a screen. Therefore, by changing a specification algorithm for specifying the operation according to the start position of the operation, it is possible to easily specify an operation having a high possibility to be performed by a user. As a result, it is possible to provide an electronic apparatus in which it is difficult for a user to erroneously perform an operation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
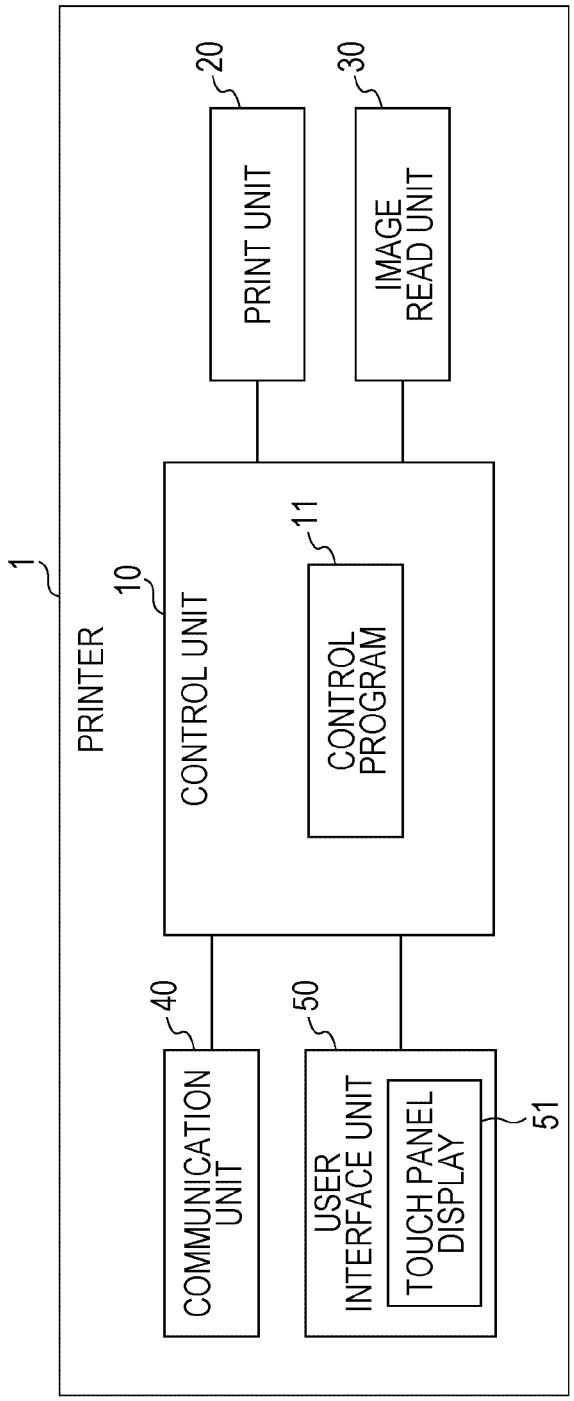
FIG. 1 is a block diagram showing a configuration of a printer.

Hereinafter, an embodiment of the invention will be described with reference to accompanying drawings. In the drawings, the same reference numerals are given to the corresponding constituent elements, and duplicate explanations are omitted.

1. First Embodiment

1-1. Configuration

FIG. 1 is a block diagram showing a configuration of a printer 1 as an electronic apparatus of the invention. The printer 1 includes a control unit 10, a print unit 20, an image read unit 30, a communication unit 40, and a user I/F unit 50, and functions as a printer having an image read function.

The print unit 20 includes actuators, sensors, driving circuits, and mechanical parts for performing printing on print media such as photographic papers, plain papers, and OHP sheets by a well-known printing method such as an inkjet method and an electrophotographic method. The image read unit 30 includes a well-known color image sensor that emits light on a document placed on a document platen and decomposes light reflected from the document platen into colors of R, G, and B to be scanned image data, an actuator for transporting the document, a drive circuit, and mechanical parts.

The communication unit 40 includes various communication interfaces for performing wired or wireless communication with external devices. In addition, the communication unit 40 includes an interface for performing communication with various removable memories mounted in the printer 1. The user I/F unit 50 includes a touch panel display 51 (hereinafter, simply mentioned as display 51) including a key input unit (not shown). The display 51 includes a display panel that displays various kinds of information under the control of the control unit 10 and a touch detection panel overlapped on the display panel, and detects touch by a finger of a person by using a well-known technology such as a capacitive technology, a resistive technology, and an optical technology. Then, the display 51 outputs touch information (for example, coordinates of touch start position and touch end position) indicating the contact to the control unit 10.

The control unit 10 is configured by a CPU, a RAM, a ROM, a non-volatile memory, and the like (not shown), and the CPU can execute a control program 11 stored in the ROM or the non-volatile memory by using the RAM or the non-volatile memory. The control program 11 is a program causing the printer 1 to perform a process, by controlling each unit of the printer 1, corresponding to an operation when the operation (for example, including tap operation (corresponds to selection operation) and swipe operation (corresponds to movement operation)) for displaying various screen constituent elements on the display 51 and performing a process on the display 51 based on touch information obtained from the display 51, is detected. Specifically, in the embodiment, a change function that changes a specification algorithm for specifying kinds of an operation performed with respect to the display 51 in accordance with a touch start position (start position of operation), and a specification function for specifying the kinds of an operation according to the specification algorithm are included in the control program 11. In a case where the control program 11 is executed, the control unit 10 functions as "a change unit" and "a specification unit".

1-2. Specification Algorithm Change Process

Figure 2:
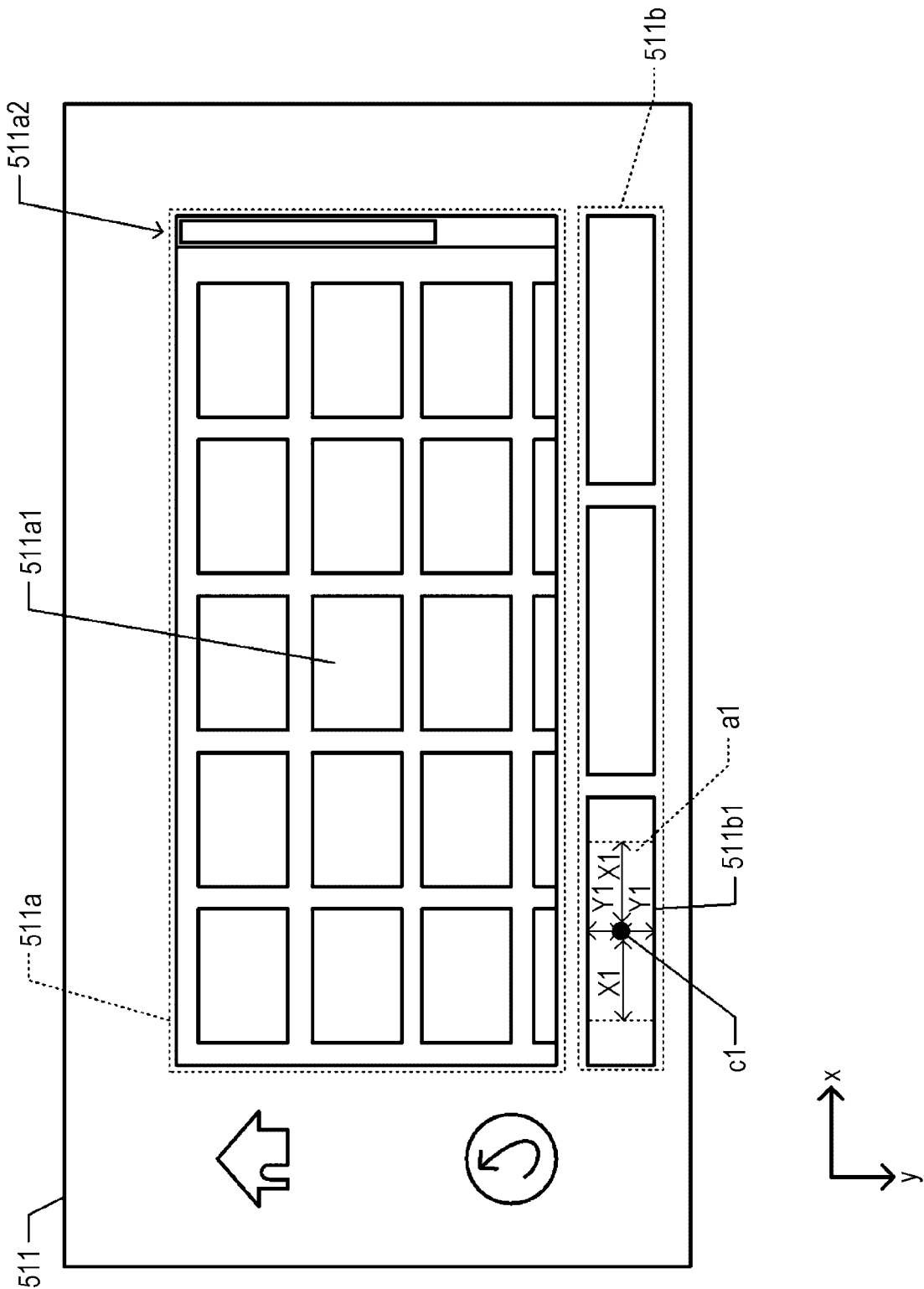
FIG. 2 is a diagram showing a configuration of a displayed screen.

FIG. 2 shows a screen 511 displayed on the display 51. For the convenience of description, it is assumed that an axis extending in parallel with a horizontal direction of the screen 511 is an x axis, and an axis extending in parallel with a vertical direction of the screen 511 is a y axis. For example, in the list area 511a of the screen 511, a list of a thumbnail image (including thumbnail images 511a1) of an image recorded in a memory card connected through the communication unit 40 and a scroll bar 511a2 are displayed. The scroll bar 511a2 is moved in a direction in parallel with y axis. A plurality of buttons including a button 511b1 are displayed in the button area 511b of the screen 511. In the list area 511a, when it is specified that the swipe operation is performed in the direction along which the scroll bar 511a2 is moved, the list of the thumbnail images scrolls in the direction in parallel with y axis. In addition, when it is specified that the tap operation is performed with respect to one thumbnail image displayed in the list area 511a, a predetermined process in which a corresponding image is determined as a selection image is performed. In addition, in a case where it is specified that the tap operation is performed with respect to one button within the button area 511b, a process corresponding to the button is performed. In the embodiment, since a process corresponding to the swipe operation is not allocated in the button within the button area 511b, in a case where it is specified that the swipe operation is performed with respect to one button within the button area 511b, a process according to the swipe operation is not performed (of course, process corresponding to tap operation is also not performed).

Figure 3:
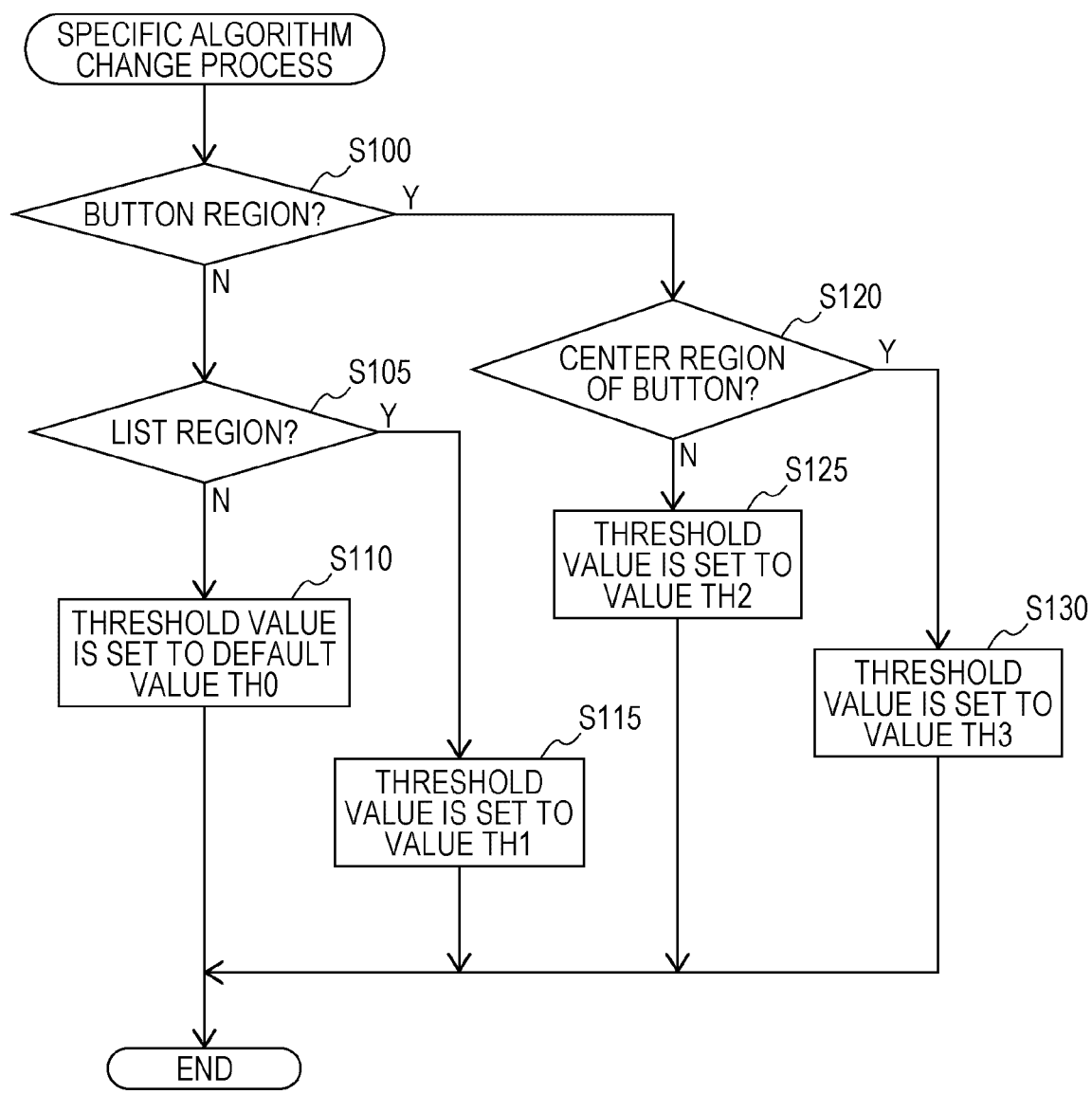
FIG. 3 is a flowchart showing a specification algorithm change process.

FIG. 3 is a flowchart showing a specification algorithm change process. The specification algorithm change process is a process for changing a threshold value so as to specify an operation for discriminating the swipe operation and the tap operation according to the touch start position (start position of operation) with respect to the display 51. The specification algorithm change process is performed in response to start of touch on the display 51. After the specification algorithm change process shown in FIG. 3 is performed, the control unit 10 specifies an operation by using a threshold value set by the specification algorithm change process, and performs a process corresponding to the specified operation (no process is performed in a case where it is not process corresponding to the specified operation).

First, the control unit 10 determines whether or not the touch start position is included in the button area 511b (step S100). In a case where it is not determined that the touch start position is included in the button area 511b, it is determined whether or not the touch start position is included in the list area 511a (step S105). In step S105, in a case where it is not determined that the touch start position is included in the list area 511a, the control unit 10 sets a threshold value to a default value TH0 (step S110).

Figure 4A:
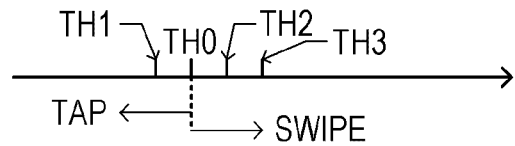
FIGS. 4A to 4D are explanatory diagrams for explaining a threshold to be changed.

FIGS. 4A to 4D are diagrams showing a threshold value for specifying the tap operation and the swipe operation. In a case where the default value TH0 shown in FIG. 4A is set as the threshold value, the control unit 10 specifies that the tap operation is performed when a movement distance from the touch start position is equal to or less than the default value TH0, and determines that the swipe operation is performed when the movement distance exceeds the default value TH0.

Figure 4B:
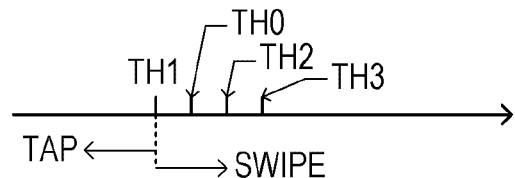

In step S105, in a case where it is determined that the touch start position is included in the list area 511a, the control unit 10 sets the threshold value to a value TH1 as shown in FIG. 4B (step S115). The value TH1 is a value smaller than a value TH0. Then, in a case where the control unit 10 sets the value TH1 as the threshold value, a configuration easy to determine that the swipe operation is performed is implemented, compared to a case where a value shown in FIG. 4A, and FIG. 4C and FIG. 4D described below is set as the threshold value. As a result, in the list area 511a, a user can scroll the list during a time a finger is moved to exceed the value TH1 in a direction in parallel with y axis while keeping the finger in contact with the display 51 from the touch start position, and the user can easily search a desired image among the list of the thumbnail images.

In step S100, when the touch start position is included in the button area 511b, the control unit 10 determines whether or not the touch start position is included in the center area of the button (step S120). Specifically, the center area in which the center of the button is set as a reference is set for each button, and it is determined whether or not the touch start position is in the center area. More specifically, for example, in a case of the button 511b1 shown in FIG. 2, a range in which a y coordinates of the coordinates of a center c1 as a reference is ±Y1 and an x coordinates thereof is ±X1, is set as a center area a1 of the button 511b1. The center area a1 and an outer edge area which will be described below are set within the button 511b1. For example, in a case where a shape of the button is circular or square, the coordinates of the center of button as a reference may also set as an area within a predetermined distance as the center area.

Figure 4C:
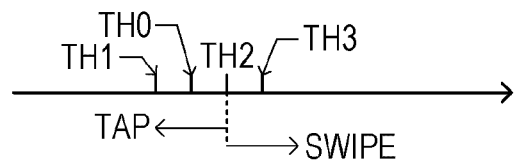
Figure 4D:
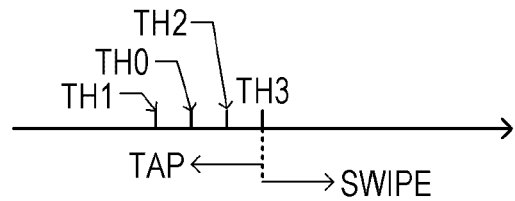

In step S120, in a case where it is not determined that the touch start position is within the center area of the button, that is, in a case where it is determined that the touch start position is included in the outer edge area that is an area other than the center area of the button, the control unit 10 sets the threshold value to a value TH2 as shown in FIG. 4C (step S125). In step S120, when the touch start position is within the center area of the button, the control unit 10 sets the threshold value to a value TH3 as shown in FIG. 4D (step S130). The value TH2 is a value greater than the default value TH0. In a case where the touch start position is included in the button area 511b, since the value of the threshold value becomes greater than the default value TH0, it is possible to implement a configuration which is easy to determine that the tap operation is performed, compared to a case where the touch start position is not included in the button area 511b. In addition, the value TH3 is a value further greater than the value TH2. In a case where the tap operation is performed with respect to the button, a possibility that a user is likely to touch near the center of button for the first time is higher than a possibility that the user is likely to touch an outer edge portion of the button. Then, the threshold value becomes the value TH3 greater than the value TH2 such that a case where the touch start position is near the center of button can easily determine that the tap operation is performed, compared to a case where it is not near the center.

Figure 5:
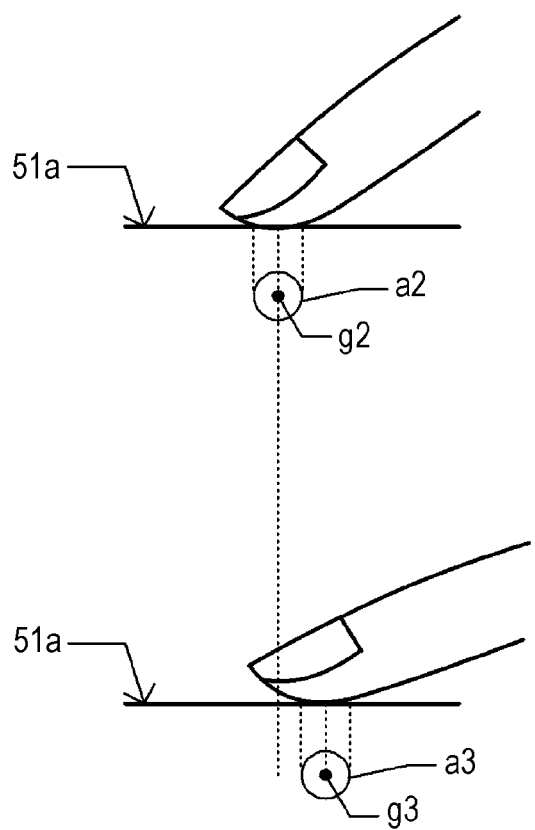
FIG. 5 is a diagram showing a tap operation.

FIG. 5 is a diagram showing an example of the tap operation. In FIG. 5, an upper diagram shows an operation on a touch detection surface 51a of the display 51 at the time of the start of the touch, and a lower diagram shows an operation on the touch detection surface 51a of the display 51 at the time of the end of the touch. An area a2 indicates a touch area at the time of the start of the touch, and a position g2 indicates the touch start position that is the center of the area a2. An area a3 indicates a touch area at the time of the end of the touch, and a position g3 indicates the touch end position that is the center of the area a3. As shown in FIG. 5, in a case of a user having a habit of stopping his/her finger after the start of the touch in the tap operation, there is a possibility that the movement distance from the position g2 to the position g3 increases. In this case, if the threshold value is the default value TH0, even when a user intends to perform the tap operation with respect to the button, since the movement distance from the touch start position exceeds the default value TH0, a phenomenon in which it is determined that the swipe operation is performed occurs. In the button area, since the threshold value is greater than the default value TH0, and the threshold value is further greater than the outer edge area in the center area of the button, it is possible to reduce occurrence of the phenomenon when the user taps the button. In a case where the user having the habit indicated in FIG. 5 performs the tap operation with respect to the thumbnail image in the list area 511a, it may be difficult to determine that the tap operation is performed with respect to the thumbnail image (it is likely to be determined that swipe operation is performed). However, in the list area 511a, in order to prioritize the followability of the scroll, the value TH1 may be a value smaller than the default value TH0 as the embodiment. The value TH1 may be set to the same value as the default value TH0.

2. Other Embodiments

The technical scope of the invention is not limited to the above-described embodiments, and it goes without saying that various modifications can be made without departing from the gist of the invention. For example, the change unit may change a specification method of a selection position in a selection operation within a specification algorithm to be the start position of the operation in a case where the start position of the operation is included in the text area, and may change the center of the touch area from the start to the end of the operation to be the selection position in a case where the start position of the operation is not included in the text area. In this case, the specification unit may specify the selection position in the selection operation according to the specification method. A specific example will be described with reference to FIG. 6.

Figure 6A:
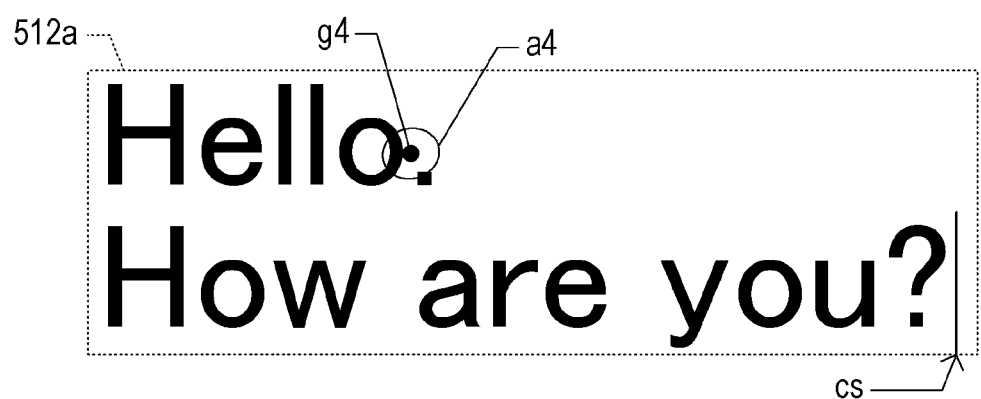
FIGS. 6A and 6B are diagrams for explaining a specification method of a selection position in a text area.
Figure 6B:
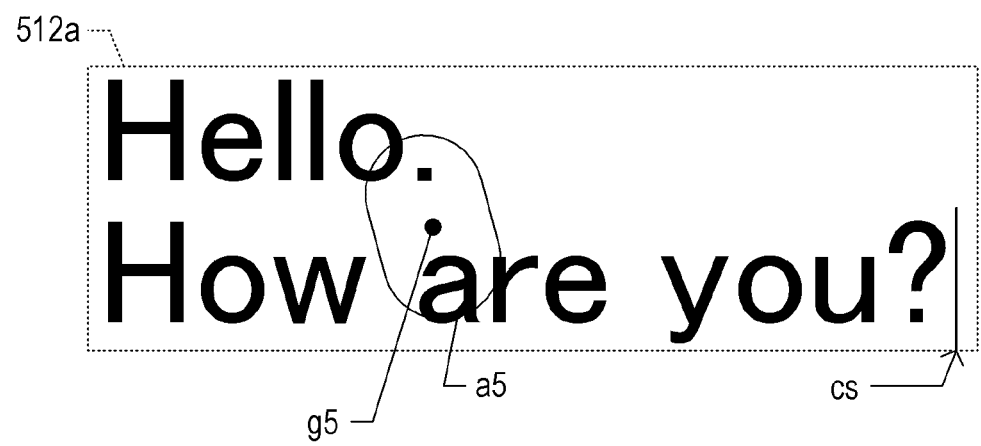

FIG. 6 shows that a plurality of characters entered by the user over two rows are displayed in the text area 512a and a cursor cs is positioned at the end of the second line. For example, a case where a user taps between "o" and "." so as to move the cursor cs between "o" and "." of the first line, will be described. An area a4 of FIG. 6A indicates a touch area which is detected by the control unit 10 for the first time, and the position g4 indicates the center (that is, start position of operation) of the area a4. The area a5 of FIG. 6B indicates a trajectory of the touch area from the start to the end of the touch on the display 51 by the user, and a position g5 indicates the center of the area a5.

For example, in a case where the center of the touch area which is touched from the start to the end of the tap operation is set as the selection position in the tap operation, as described in FIG. 6B, since the selection position becomes an area between a space before "a" of the second line and "a", an erroneous operation in which the cursor cs is moved between the space before "a" and "a", occurs. However, in a case where the start position of the operation is within the text area, based on a design concept that there is a high possibility that a position in which the tap operation starts may be the selection position intended by the user, the start position of the operation is specified as the selection position, and thus the position g4 shown in FIG. 6A can be set as the selection position in the tap operation, and the cursor cs can be moved to the position intended by the user. As to the tap operation, for example, the method for specifying the selection position with respect to the user having the habit as indicated in FIG. 5 is particularly effective.

The button area is an area on which the button is displayed. The button enables at least the selection operation. The list area is an area on which a list of a plurality of objects is displayed. The list area enables at least the movement operation for moving a display position of the object. The text area is an area on which characters and symbols are displayed. The text area enables at least the selection operation.

In the first embodiment, a process corresponding to the swipe operation is not allocated in the button within the button area. However, a process (for example, movement in display position of button, display of pull-down menu and drop-down list, increment or decrement of display area of button, or the like) according to the swipe operation may also be allocated in the button.

A first operation corresponds to the swipe operation (movement operation) for moving the display position of an operation target object in the first embodiment, and a second operation corresponds to the tap operation (selection operation) for selecting the operation target object. However, the embodiment may be not limited to the correspondence relationship. For example, a configuration, may be implemented, where the first operation and the second operation are the swipe operation, and the first operation in which the movement distance from the operation start position is longer than that of the threshold value and the second operation in which the movement distance from the operation start position is equal to or smaller than that of the threshold value are allocated by different processes. In addition, the first operation and the second operation are the tap operation. However, a configuration, may be implemented, in which different processes are allocated according to the movement distance from the operation start position.

In addition, in a case where an area including a start position of an immediately preceding operation is the same as an area including a start position of a current operation (or in case of region of the same type), compared to a case where the area including the immediately preceding operation is different from the area including the start position of the current operation (or in case of region of different type), the specification algorithm may be changed to easily specify that the current operation is the same operation as the immediately preceding operation. For example, in a case where an operation in which the start position is set within the button area 511b is performed after the swipe operation in which the start position is set within the list area 511a (that is, case where operation, is performed in next time, in which start position is set within area (also different type area) different from area including start position of operation that is performed immediately before), the control unit 10 determines the threshold value according to the flowchart of FIG. 3. On the other hand, after the swipe operation in which the start position is set within the list area 511a, in a case where the operation, is performed, in which the start position is set within the list area 511a again (that is, case where operation in which the same area as start position of immediately preceding operation is set as start position), the threshold value is set to TH4 smaller than TH1, and thus it may be to easily determined that the swipe operation that is the same as the immediately preceding operation is also performed in the current operation. In addition, in a case where an operation, is similarly performed, in which the start position is set within the list area 511a after the tap operation in which the start position is set within the list area 511a, the threshold value is set as TH5 greater than TH1, and thus it may be to easily determined that the tap operation is also performed in this time.

In addition, the threshold value may be determined for each movement direction of the touch area in consideration of a movement direction of the touch area.

In addition, the functions of each unit described in the aspects are realized by hardware resources whose functions are specified by the configuration itself, hardware resources whose functions are specified by programs, or a combination thereof. In addition, the functions of these units are not limited to those realized by physically independent hardware resources. The invention is applicable to various electronic apparatuses including touch panel type displays such as smart phones and tablet terminals in addition to printers. The display included in the electronic apparatus is not limited to the touch panel display. Even in a case where an operation is performed by using a pointing device such as a mouse with respect to a display not including the touch panel, it is possible to apply the invention. In this case, the selection operation corresponds to click or double click, and the movement operation corresponds to drag.

What is claimed is:

1. An electronic apparatus comprising:
   a display that
     displays a plurality of areas, at least one of the plurality of areas prioritizing one of a plurality of operations comprising at least a first operation and a second operation, and
     detects an operation that starts at a start position on the display;
   a change unit that changes a specification algorithm for specifying an operation with respect to the display according to a start position of the operation; and
   a specification unit that specifies the operation according to the specification algorithm,
   wherein the specification algorithm is an algorithm that determines whether the start position is in at least one area that prioritizes one of the plurality of operations, specifies the operation as the first operation in a case where a movement distance from the start position of the operation to an end position of the operation is greater than a threshold value,
   specifies the operation as the second operation in a case where the movement distance is smaller than the threshold value,
   in response to a determination that the start position is in an area that prioritizes the first operation, the change unit decreases the threshold value,
   in response to a determination that the start position is in an area that prioritizes the second operation, the change unit increases the threshold value,
   when the start position is within a predetermined center area of a button, the change unit increases the threshold value by a first amount, and
   when the start position is not within the predetermined center area of the button, the change unit increases the threshold value by a second amount, the first amount being greater than the second amount.

2. The electronic apparatus according to claim 1,
wherein the change unit changes the specification algorithm according to an area including the start position of the operation, and
wherein the area is at least one of a button area, a list area, and a text area.

3. The electronic apparatus according to claim 1,
wherein the specification unit specifies whether the operation is a selection operation or a movement operation.

4. The electronic apparatus according to claim 1,
wherein a button is displayed on the display to enable a selection operation, and
wherein the change unit changes a value of the threshold value to be increased in a case where the start position of the operation is included in a center area of the button, compared to a case where the start position of the operation is included in an outer edge area that is an area other than the center area of the button.

5. The electronic apparatus according to claim 1, wherein the plurality of areas comprises a scrollable list area and a non-scrollable button area,
the first operation is a swipe operation,
the second operation is a tap operation,
the scrollable list area prioritizes a swipe operation, and
the non-scrollable button area prioritizes a tap operation.

6. The electronic apparatus according to claim 5, wherein
in response to a determination that the start position is in a scrollable list area, the change unit decreases the threshold value.

7. The electronic apparatus according to claim 5, wherein
in response to a determination that the start position is in the non-scrollable button area, the change unit increases the threshold value.

* * * * *